United States Patent

Niss

[11] Patent Number: 5,551,599
[45] Date of Patent: Sep. 3, 1996

[54] DISPENSING DEVICE FOR FLAWING SUBSTANCES HAVING A PRESSURE CONTROLLED PUMP ARRANGEMENT

[76] Inventor: Jan-Anders Niss, Smultronvägen 1, Malung, Sweden, S-782 34

[21] Appl. No.: 284,429

[22] PCT Filed: Jan. 13, 1993

[86] PCT No.: PCT/SE93/00014

§ 371 Date: Aug. 3, 1994

§ 102(e) Date: Aug. 3, 1994

[87] PCT Pub. No.: WO93/14679

PCT Pub. Date: Aug. 5, 1993

[30] Foreign Application Priority Data

Feb. 3, 1992 [SE] Sweden ................... 9200287

[51] Int. Cl.⁶ ........................................ B27D 5/08
[52] U.S. Cl. ..................... 222/63; 222/83; 222/207; 222/214
[58] Field of Search ................ 222/83, 55, 63, 222/01, 207, 204, 213, 214, 130

[56] References Cited

U.S. PATENT DOCUMENTS

| | | | |
|---|---|---|---|
| 2,742,191 | 4/1956 | Corsaw | 222/130 |
| 3,645,423 | 2/1972 | De Graw | 222/207 |
| 3,847,304 | 11/1974 | Cohen | 222/105 |
| 4,515,294 | 5/1985 | Udall | 222/105 |
| 4,708,266 | 11/1987 | Rudick | 222/105 |
| 4,717,047 | 1/1988 | van Overbruggen et al. | 222/207 |

FOREIGN PATENT DOCUMENTS

| | | | |
|---|---|---|---|
| 576818 | 1/1994 | European Pat. Off. | 222/207 |
| 2177523 | 1/1987 | United Kingdom | 222/63 |
| 2223217 | 1/1990 | United Kingdom | 222/63 |

Primary Examiner—Andres Kashnikow
Assistant Examiner—Philippe Derakshani
Attorney, Agent, or Firm—Jacobson, Price, Holman & Stern, PLLC

[57] ABSTRACT

A dispensing device for flowing substances, especially food substances, comprises a valve arrangement (2) for controlling flow of substance from a container (3) out through a discharge opening (4). The container (3) is of the type that decreases its volume at the same rate as with which the substance is discharged from the container in order to avoid that the substance in the container there gets in contact with air. Between the valve arrangement (2) and the container (3) a conduit (6) is extending, which is co-ordinated with a pump arrangement (7) arranged to transport the substance in the conduit without getting in direct contact with the substance.

9 Claims, 6 Drawing Sheets

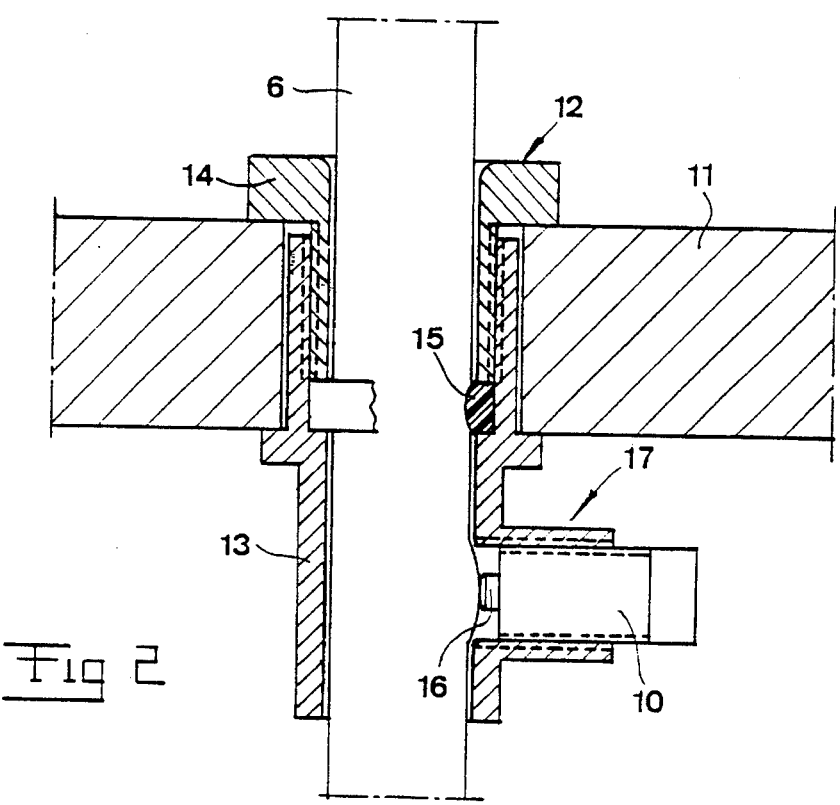
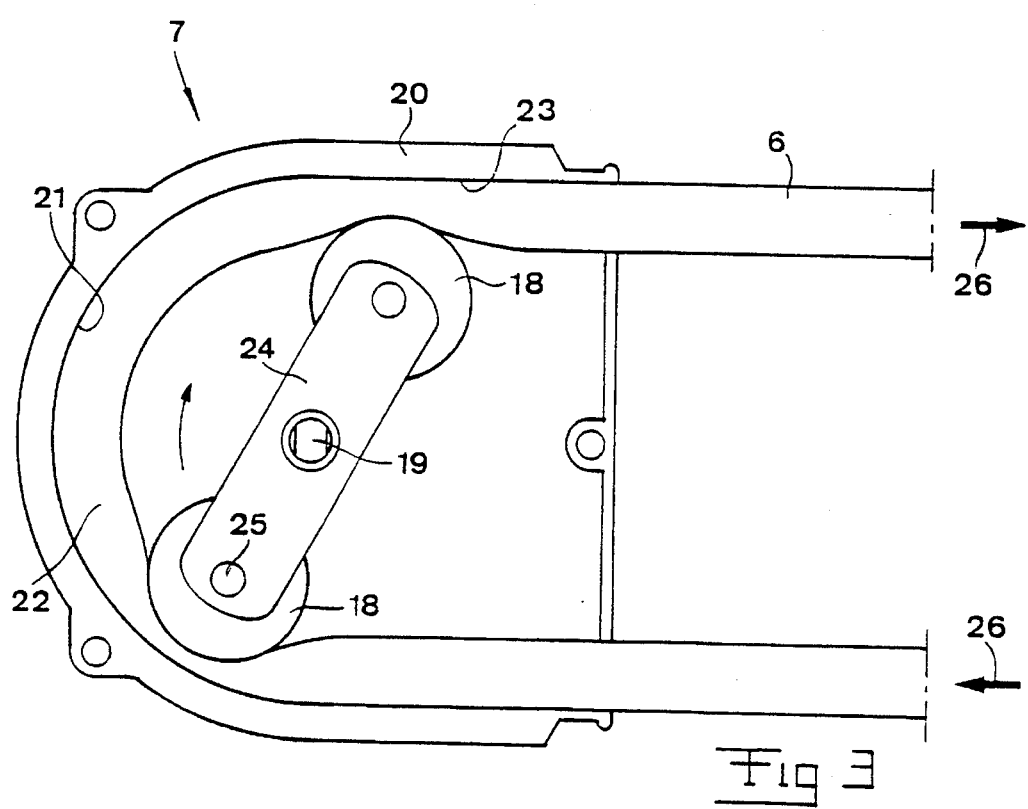

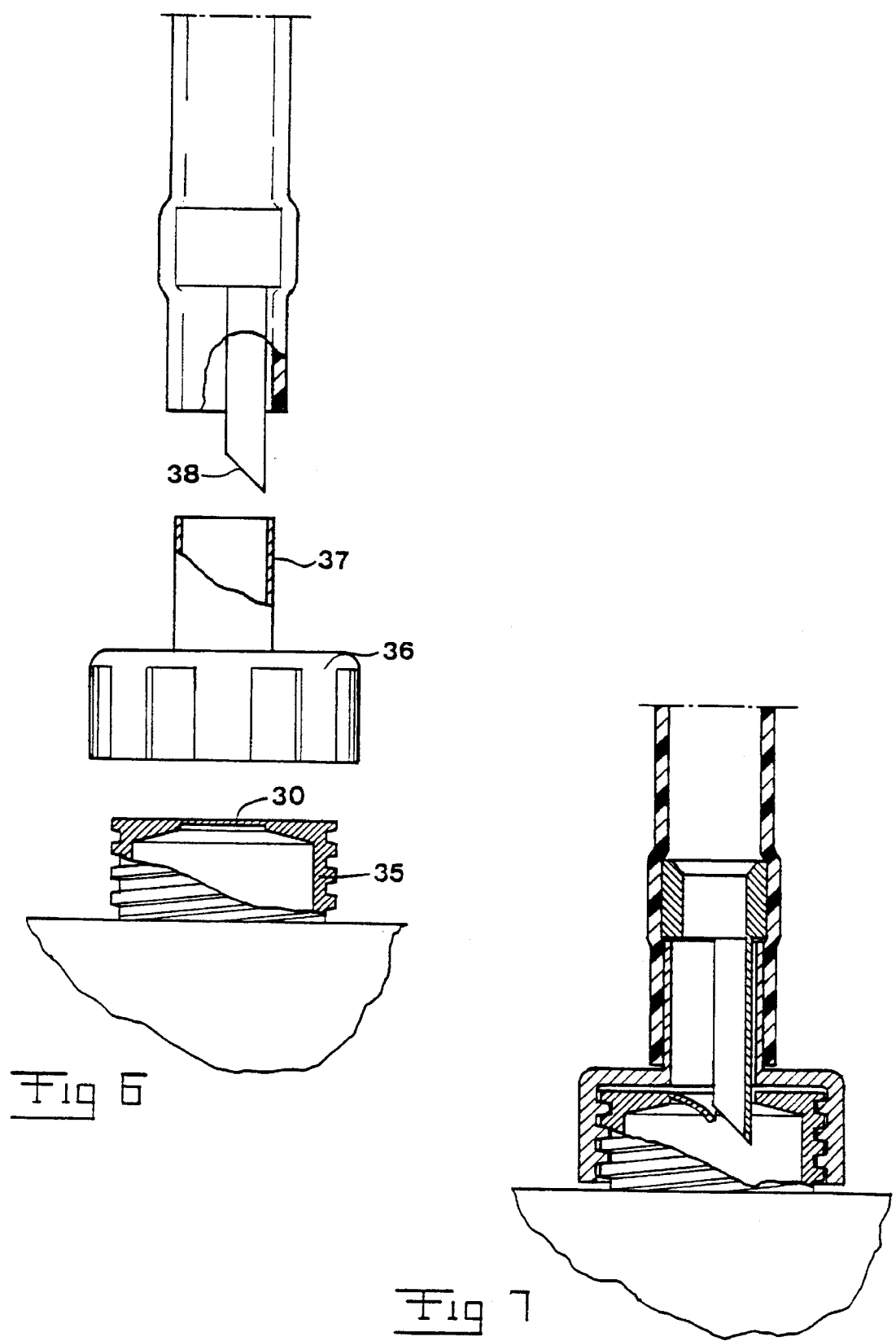

DISPENSING DEVICE FOR FLAWING SUBSTANCES HAVING A PRESSURE CONTROLLED PUMP ARRANGEMENT

FIELD OF THE INVENTION AND PRIOR ART

This invention relates to a dispensing device for flowing substances. What here is primarily related to are flowing food substances, such as mustard, ketchup, dressings and so on within the restaurant and kiosk business, cream, butter creams, jams and so on within the bakery business etc.

The handling now used for food products of additive character for the food industry, e.g. bakeries etc., and the restaurant business is affected by several deficiencies. Thus, it is today usual that the containers containing the food product in question are located in room temperature for hours, days not to mention weeks before the content of the containers has been consumed. Furthermore, such considerable lengths of time also often pass between thorough cleaning of the containers and the dispensing devices used. Such extended dwell times of food products in room temperature give rise to a rapid increase of micro organisms harmful to humans. This is especially the case as the food substances in question often are in contact with the surrounding air. According to known art it is namely required, to even get the food substance out of actual containers with the dispensing devices used, that vent openings are present between the interior of the containers and the surrounding since the discharging of substance out of the containers otherwise would be counteracted by the tendency of forming of vacuum therein, which arises at the discharging of substance. It is true that attempts are made to reduce this increase by admixing considerable quantities of pesticides active against the micro organisms in question to the food products involved. However, it is today a nearly unanimous opinion within the staff of medical re- searchers within this field that such pesticides are considerably more harmful to the human organism than expected before. Once the content of pesticides is reduced or such means are totally eliminated, an even more rapid increase of micro organisms is created.

SUMMARY OF THE INVENTION

The object of the present invention is to reduce the deficiencies discussed above and other problems within the art. Thus, a dispensing device shall be provided, where the food substance gets a very good durability without involving for that sake any dependence of chemical pesticides; instead, the invention intends to indicate means for working out the dispensing device so that the contact with the oxygen of the surrounding air and micro organisms, being responsible for the degradation of the food substance, is avoided to a maximum degree. Furthermore, the invention aims at indicating solutions, advantageous from a constructive point of view, for working out the dispensing devices in question.

By using, in accordance with what is defined in claim 1 in combination with the dispensing device here involved, a container of the type that decreases its volume at the same rate as with which the substance is discharged from the container, one can avoid that the substance in the container gets in contact with the surrounding air. This means that foods substances can stay in the container for a very long time without being degraded. In the context it is preferred that the container has the character of a flexible bag.

By working out the dispensing device with a tube of a flexible material adapted to receive substance coming from the container and arranging the valve arrangement, as affectable for regulation of flow by pressure action on the flexible tube in accordance with claim 3, it is achieved that the food substance contained in the tube not either there risks being subjected to degenerating contact with the surrounding air. Further, there is not required any sealed inlets of manoeuvre arms or the like, occurring in earlier valve arrangements known per se.

An especially advantageous solution is obtained in case a conduit extends between the valve arrangement and the container, said conduit being co-ordinated with a pump arrangement arranged to transport the substance in the conduit without getting in direct contact with the substance. Thereby the food substance consequently doesn't need to pass through any pump chamber provided with axle inlets or the like, which would result in need of quite difficult cleaning and also cause risk for contamination of the food substance and leakage of air.

In connection therewith, it is an advantage if a pressure sensor is co-ordinated with the conduit between the valve arrangement and the pump arrangement, which sensor, at obtaining a certain pressure level, interrupts the function of the pump arrangement and once again starts the pump arrangement at underpassing of a certain level and that this pressure sensor is arranged to be affected by width changes of the conduit depending on the pressure in the latter. Expressed in other words, the pressure sensor doesn't need to be in any direct contact with the substance but indirectly senses the pressure in the conduit by being affected by the width of the conduit. This assumes of course a flexible or hose-like structure of the conduit along at least a part thereof. An easily accomplished manoeuvering of the valve arrangement is obtained in case the dispensing device, as is apparent from claim 8, comprises a tube of a flexible material adapted to receive the substance from the container via the conduit, the valve arrangement being arranged to close against flow of substance from the tube when the latter is unaffected from outside but to open when the tube is affected by pressure from outside with a force above a certain threshold value.

Further advantageous designs of the dispensing device according to the invention appear from the dependent patent claims and from the following closer description.

BRIEF DESCRIPTION OF THE DRAWINGS

With reference to the following drawings, below follows a more specific description of embodiments of the invention cited as examples.

In the drawings:

FIG. 2 is a partially sectioned detailed view illustrating a conduit lead-through and a pressure sensor, FIG. 3 is a schematic view of a pump arrangement included in the device, FIG. 6 is an exploded side view illustrating an alternative to what is illustrated in FIG. 4, FIG. 7 is a view similar to FIG. 5, though showing the components appearing from FIG. 6.

DETAILED DESCRIPTION OF PREFERRED EMBODIMENTS

Figure 1:
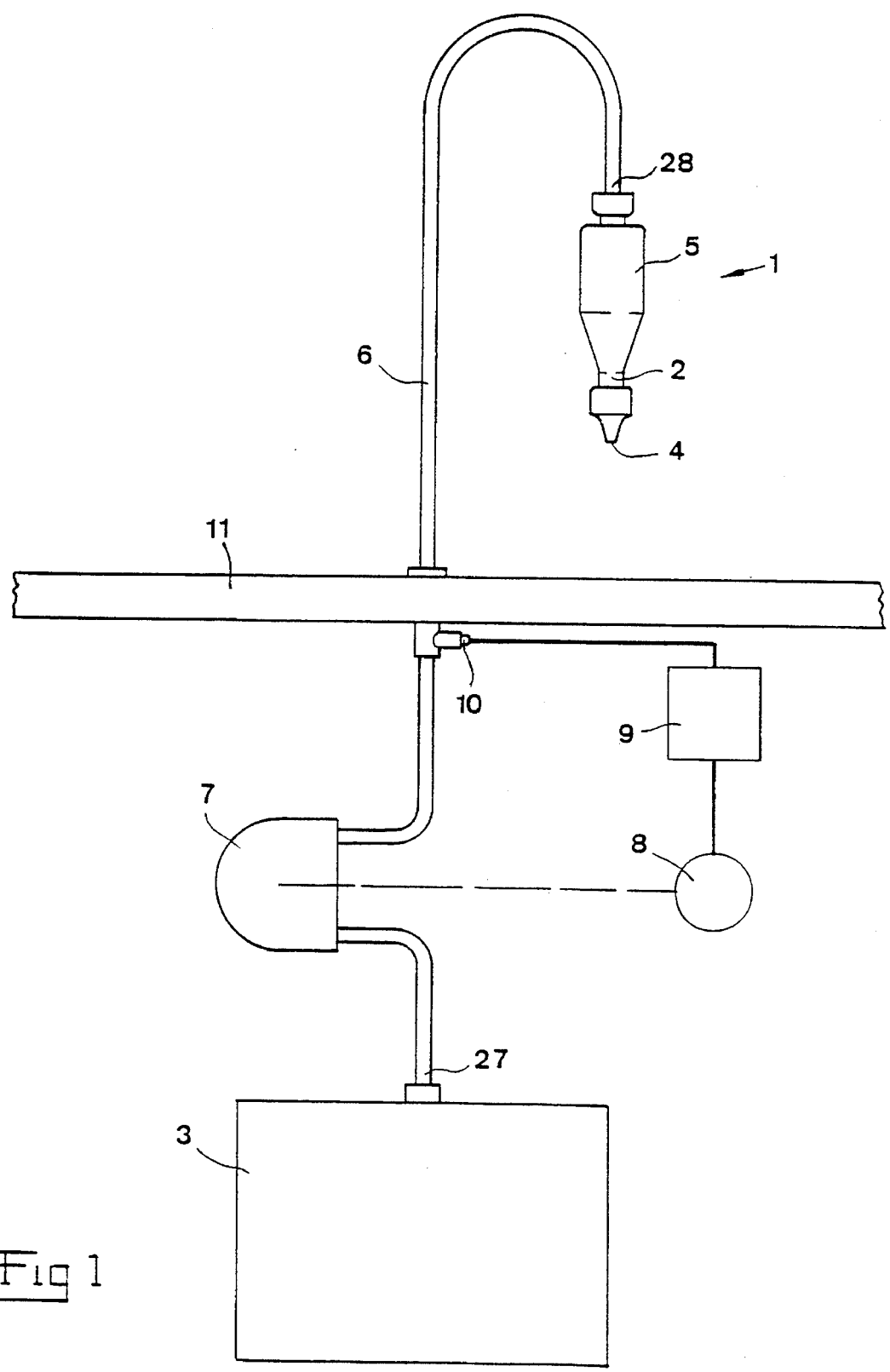
FIG. 1 is a schematic overall view of the dispensing device according to the invention.

In FIG. 1, a device for dispensing of flowing substances, especially food substances, such as mustard, ketchup etc., is schematically illustrated, said device comprising a dispensing unit 1 with a valve arrangement 2 for regulating flow of substance from a container 3 out through a discharge opening 4.

The container 3 is of the type that decreases its volume at the same rate as with which the substance is discharged from the container in order to avoid that the substance in the container there gets in contact with air. A preferred form of embodiment of the container 3 is as a flexible bag. At delivery from the factory, the container 3 is accordingly assumed to be filled with substance without any air filled share of the space in the container existing. As the substance discharges from the container, the latter one reduces its volume so that the container in emptied state is generally flat. It should be interposed, that the container 3 does not necessarily need to have the character of a flexible bag but could possibly instead consist of some telescopic unit capable to be pressed together for reduction of the volume.

The device comprises a tube 5 of a flexible material adapted to receive the substance coming from the container 3. The valve arrangement 2 is arranged to be affected for flow regulation by pressure action on the flexible tube 5. This pressure action is primarily intended to be manual, i.e. that the operator of the device grips the tube 5 with the hand and presses it together, more or less, depending on how much substance the Operator wishes to discharge.

Between the valve arrangement 2 and the container 3 a conduit 6 is extending, which is co-ordinated with a pump arrangement 7 arranged to transport the substance in the conduit without getting in direct contact with the substance. The pump arrangement 7 is driven by a motor 8, whose operation is controlled by a control unit 9, which executes the control of the motor 8 depending on information received from a pressure sensor 10 and corresponding to the pressure of the substance in the conduit 6. More precisely the function is such, that at a certain pressure level of the substance in the conduit established by the pressure sensor 10, the control unit 9 controls the motor 8 to interrupting the effect of the pump of the pump arrangement 7, while the control unit 9 starts the pump arrangement when the pressure underpasses a certain level. This, accordingly, means that downstream of the pump arrangement 7, a generally constant overpressure will exist, while the pressure upstream of the pump arrangement 7 is depending on if the latter in practice will suck the substance from the container 3 or if the container 3 is so oriented in relation to the pump arrangement 7 that the substance tends to automatically, through the influence of the gravity force, arrive to the pump arrangement.

The valve arrangement 2 is arranged to close against flow of substance from the tube 5 when this one is unaffected from outside but to open when the tube is affected from outside by pressure with a force above a certain threshold value. In other words, the valve arrangement shall accordingly, when the tube 5 is unaffected by the operator, be capable of closing so that the overpressure, existing in the conduit 6 between the valve arrangement and the pump arrangement, doesn't give rise to any flowing out of substance via the discharge opening 4. A supplementary pressure, arising as the operator presses the tube 5 together, shall however give rise to the pressure in the conduit 6 being so much increased that the valve arrangement 2 opens. In the context it is interposed that the pump arrangement 7 should be of such type that an increasing pressure in the conduit 6 as a result of pressing together of the tube 5 can not cause the substance to flow through the pump arrangement 7 in the backward direction towards to container 3.

In the case according to FIG. 1, the conduit 6 is thought to extend from the container 3 to the dispensing unit 1 while passing through an opening in a plate 11. This one is more clearly illustrated in FIG. 2, from which also appears that a clamping coupling generally indicated with 12, is arranged to clamp the conduit 6 tight in relation to the plate 11 for avoiding the conduit 6 from sliding back and forth in relation to the plate 11. This one can be constituted by a bench top or the like in a restaurant, a kiosk or similar.

The clamping coupling 12 comprises two parts 13, 14 co-operating with each other and shaped for, on one hand, being locked tight in relation to the plate 11, and, on the other hand, affect a clamping means 15, for example a rubber ring, to be pressed against the tube 6 located on the inside thereof for fixing of position. In the example, the parts 13, 14 are thought to present threads co-operating with each other so that the parts can be brought to be locked together in relation to the plate 11 by screwing and, at the same time, the rubber ring 15 is deformed to clamp against the conduit 6. The latter extends through a passage commonly formed by the parts 13, 14.

In FIG. 2 the pressure sensor 10 is also illustrated. This comprises a sensing means 16 arranged to be affected by width changes of the conduit depending on the pressure within the conduit 6. This prerequisites that the conduit 6 to at least a part is flexible or hose-like and enough deformable concerning width, so that pressure changes occurring shall give rise to width changes sensible by relatively uncomplicated sensing means. Hence it follows that the pressure sensor 10 only senses the pressure indirectly, i.e. that the pressure sensor 10 is not in any direct contact with the substance in the conduit 6 but with the outer jacket surface of the conduit. The pressure sensor 10 is suitably arranged in a cavity in a suitable socket 17 and the conduit 6 extends past this cavity so that the conduit at pressure increase in the same can expand more or less into this cavity and thereby affect the sensing means 16.

Though, of course, the pressure sensor 10 can be arranged totally separated from the clamping coupling 12, FIG. 2 shows that a possible form of the embodiment is to integrate the socket 17 with the clamping coupling 12, in the example with the lower part 13 of the latter.

The pump arrangement is in FIG. 3 more closely illustrated together with a part of the conduit 6. At least the part of the conduit illustrated in FIG. 3 is designed like a hose and this hose part forms part of the pump arrangement 7 by comprising one or more pump means 18 which are arranged so as to be moved along a portion of the hose during pressure action against the same. In the example, that hose portion extends in form of an arc and the pump means 18 are rotatingly arranged around an axle 19, which substantially forms the centre for the arc of the hose portion.

The pump arrangement 7 comprises a housing 20 which is formed by two housing halves fastened to each other, of which only one is shown in FIG. 3. The housing 20 forms interiorly a support surface 21, formed as a circle arc, for the hose portion 22. The support surface 21 is suitably generally formed as a half circle and merges into tangentially directed support surface parts 23. The pump means 18 are arranged on a carrier 24, which is driven in rotation around the axle 19. The pump means 18 suitably have the character of rollers or pulleys, which are rotationally arranged around axles 25 on the carrier 24.

When the carrier 24 rotates, the pump means 18 will, in the area of one of the tangential support surface parts 23, get in contact, in a successive way, with the hose portion 22 so that the hose portion is squeezed together. Further rotation of the carrier 24 in the direction of the arrow in FIG. 3 means that the place for squeezing together of the hose will be displaced forwardly so that substance existing in the hose at the same time also will be displaced forwardly. At the same time the hose once again expands behind the place of squeezing together so that the result becomes a transport of the substance in the direction of the arrows 26.

It should be noted that in the showed example of the embodiment it is of importance that the number of pump means 18 is so large, in practice at least two, that when one of the pump means gets out of the squeezing engagement with the hose portion 22, the other pump means shall already have gone into squeezing co-operation with the hose portion, i.e. that independently of the position of the pump means 18, any free passage backwards past the pump arrangement 7 in direction towards the container 3 shall never be present. This also means a relatively stable holding of pressure downstream of the pump arrangement 7.

It is preferred that the conduit 6 is in one single piece of material, preferably one single, continuous hose piece, all the way from an end part 27 which is intended for being connected to the container 3 until the opposite end part 28 which is intended for being connected to the dispensing unit 1.

Figure 4:
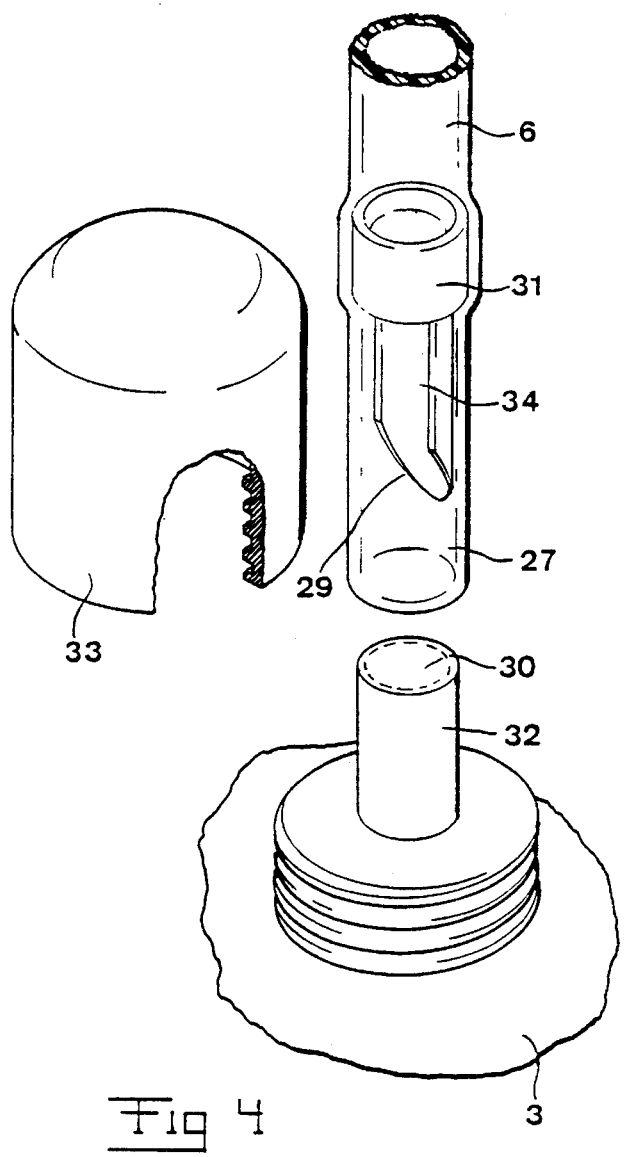
FIG. 4 is a perspective exploded view of a part of a container and a conduit adapted for connection thereto.
Figure 5:
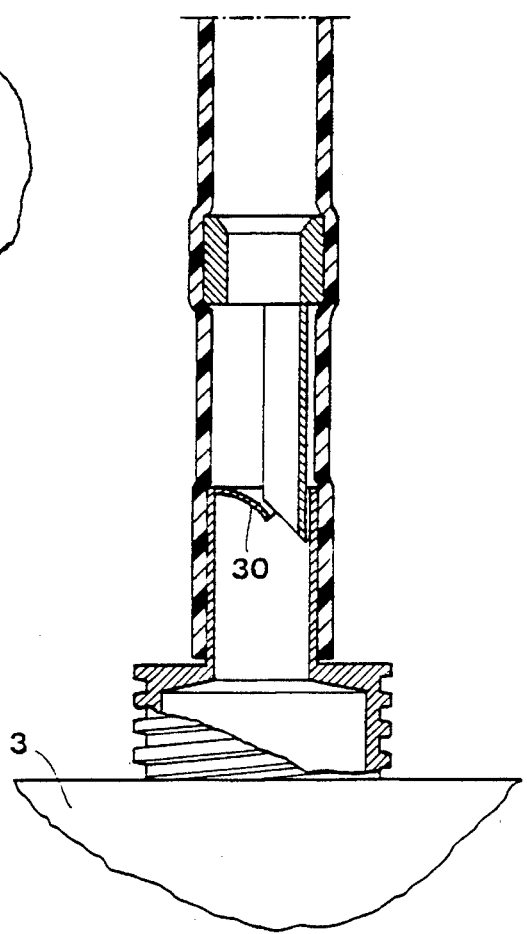
FIG. 5 is a partially sectioned side view illustrating the conduit and the container-in FIG. 4 as assembled.

At its end 27 intended for connection to the container 3 the conduit 6 presents (see FIG. 4 and 5) a cutting means 29 arranged to cut through a sealing 30 arranged on the container 3. This sealing has the purpose to, from the filling of the container onwards, hold the substance existing therein hermetically separated from the surrounding atmosphere in order to avoid degradation of the substance. In the example, the cutting means 29 is designed upon a body 31, which is received within the conduit end 27 and is held in place there by the squeezing action of the hose conduit 27 or by any other suitable type of arrangement. The sealing 30, normally in the form of a sheet, is in the example arranged at the end of a protruding tube section 32. During transport, the container 3 is suitably co-ordinated with a cover 33 which prevents the sealing 30 from being unintentionally broken.

The cutting means 29 is so located in relation to the outer end of the conduit 27, that the conduit end gets into sealing surrounding of the tube section 32 before the cutting means 29 breaks through the sealing 30. The sealing means 29 have the character of an edge, suitably extending obliquely, on a groove section 34 which cross sectionwise is generally formed as a half circle. At putting on the conduit end on the tube section 32, it is thereby obtained that the cutting means 29 cuts out a patch of the sealing 30 and this patch permits passing through of the substance without being completely loosened from the container 3 and following the substance in the direction towards the dispensing unit.

The variant illustrated in FIG. 6 and 7 differs from the preceding embodiment as the sealing 30 here is at the end of the threaded connection 35 of the container 3 so that before the conduit 27 is put on the container, an intermediate part 36 must be mounted at the container and this intermediate part presents an inwardly threaded jacket designed to engage with the threading of the container and further with a protruding tube section 37, which is the one, on which the conduit end 27 is put. The cutting means 38 is also here so located in relation to the end of the conduit 27 that the conduit sealingly is put on the tube section 37 before the cutting means 38 cuts through the sealing 30.

Figures 8, 9:
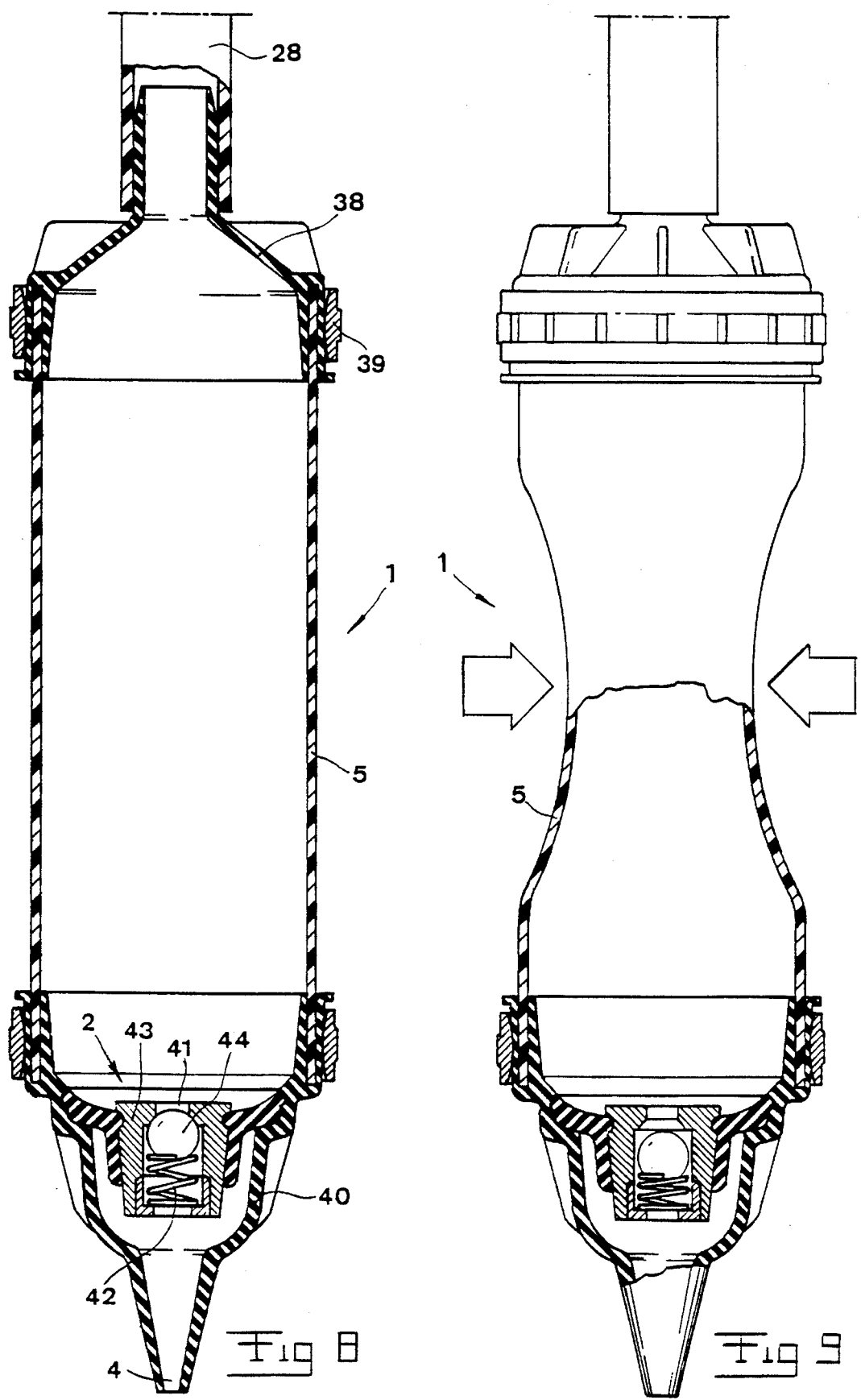
FIG. 8 is a partially sectioned side view of a dispensing unit, included in the dispensing device, comprising a tube of a flexible material.
FIG. 9 is a view similar to FIG. 8 but illustrating the tube as pressed together.

In FIG. 8 and 9 an example of the design of the dispensing unit 1 is illustrated. The flexible tube 5 has such a diameter and such a length that it becomes comfortably possible to grip with the hand and possible to squeeze together in the way that is schematically indicated in FIG. 9. The tube 5 can on top be connected in a suitable way known per se, for example through a clamping ring 39, to a connection section 38, which presents a tube section, on which the conduit end 28 is put on. At the opposite end of the tube 5 there is also a section 40 connected to the tube 5, said section forming at its lower end the discharge opening 4. The valve arrangement 2 is arranged at the lower part of the tube 5 and so close to the discharge opening as possible.

The valve arrangement 2 has the character of a non return valve, designed to close a passage 41 between the interior of the tube 5 and the discharge opening 4 when the tube 5 is unaffected by the operator, but when the operator grips around the tube 5 and squeezes it together, the increase of pressure thereby arising causes a total pressure in the tube 5 composed, on one hand, by the pressure of the pump arrangement 7 and, on the other hand, by the pressure of the hand of the operator on the tube 5, and this total pressure is intended to be able to overcome the force from elastic return means 42 which intend to respectively hold the valve arrangement in and bring it back to a closing state. This, accordingly, gives rise to opening of the valve arrangement and the substance can consequently flow through towards the discharge opening 4.

In the example, the valve arrangement 2 is formed by a ball valve which presents a valve housing 43 in which the passage 41 is designed. Around the passage 41 a valve seat is formed, against which the ball 44 is intended to bear. The elastic return means 42 have here the character of a helical spring affecting the valve ball 44 to sealing bearing against the valve seat.

Figure 10:
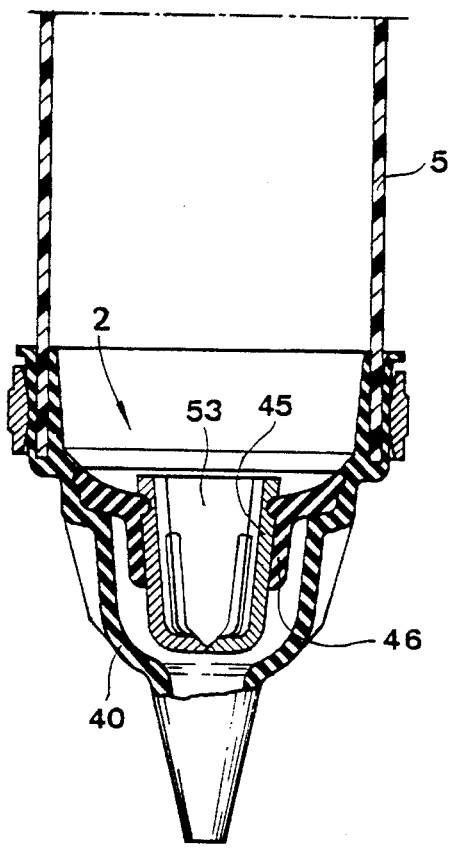
FIG. 10 is a view similar to the bottom part of FIG. 8 but with another valve arrangement.
Figure 11:
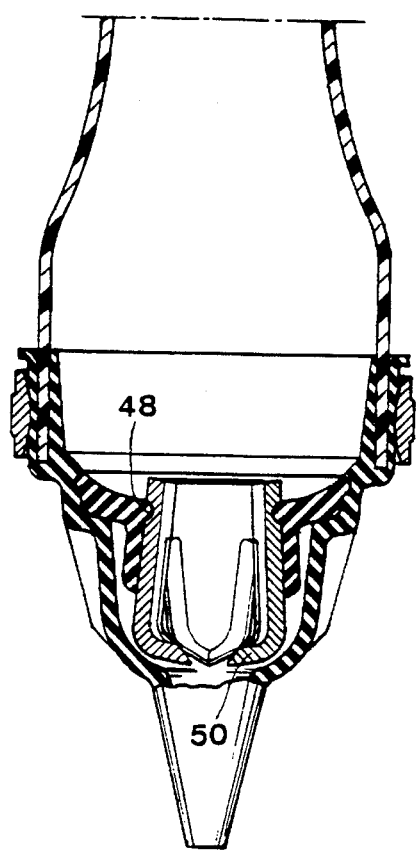
FIG. 11 is a view similar to FIG. 10 but with the tube pressed together.
Figure 12:
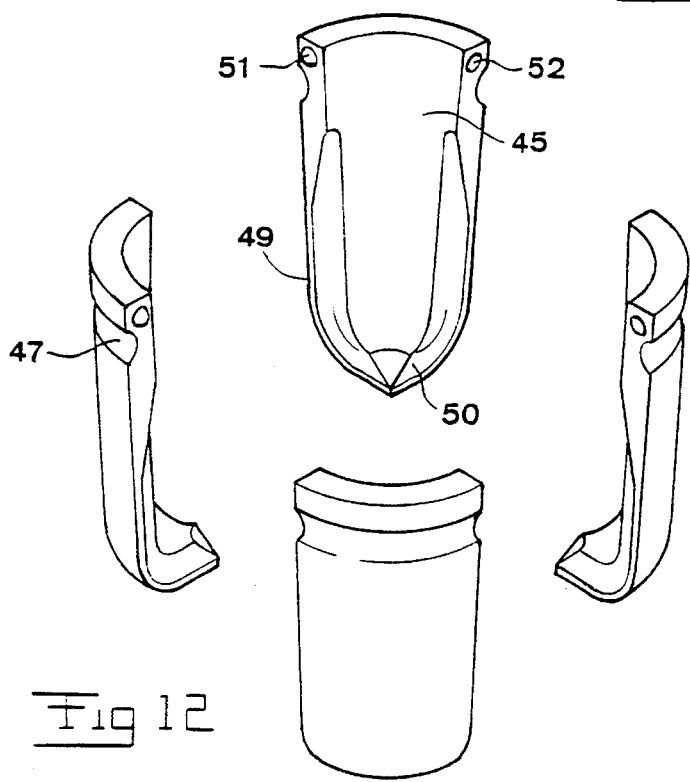
FIG. 12 is a perspective view illustrating the shaping of valve means included in the valve arrangement.

The variant illustrated in FIG. 10–12 only differs from the one illustrated in FIG. 8 and 9 concerning the design of the valve arrangement 2. The description will here accordingly be concentrated on the differences. In FIG. 10–12, the valve arrangement 2 comprises a plurality of valve means 45, which are adapted to each other to, in a first relative state (FIG. 10), stop flow past the valve means and, in a second relative state (FIG. 11 ), open for such flow. In the example, the valve means are four in number but this is not anything binding for the concept of the invention.

Elastic return means are provided for affecting the valve means 45 to closing position. These return means can for example be formed by an elastic means 46 extending around the valve means 45 and fastened in relation to the flexible tube 5 or the end section 40.

The elastic means 46 around the valve means 45 has the character of a sleeve formed as a ring, which grips around the valve means and squeezes them radially inwards to bearing against each other. Accordingly, the elastic means 46 will counteract the valve means 45 or parts thereof moving radially outwards, i.e. away from each other.

As appears from the figures of the drawings, the elastic means 46 and the valve means 45 can present parts engaging with one another in order to obtain mutual determination of position. These parts have the character of projections/recesses. In the example, recesses 47 (FIG. 12) are arranged on the valve means 45 while a projection 48, fitting into the recesses 47, is arranged on the elastic means 46. Those latter can for example commonly form a circular path, in which case the projection 48 on the elastic means 46 is formed by a ring-shaped bead extending inwards.

The valve means 45 lie in a closing position against each other along bearing surfaces 49 and the valve means are arranged so as to, at opening, rock against each other so that their ends 50, located downstream as seen in the discharging direction, move from each other (see FIG. 11). The ends of the valve means located upstream are arranged to sidewardly bear against each other as the valve means rock in relation to each other.

As is indicated in FIG. 12, adjacent valve means 45 can engage with each other via shape locking means, e.g. projections/pins 51 and recesses 52.

According to a suitable embodiment, every single valve means 45 can thereby present a pin 51 for engaging in adjacent valve means and furthermore a recess 52 intended to fit together with a pin of the other adjacent valve means.

The valve means 45 form in their closing position a cross sectionwise generally circular configuration. Every single valve means forms thereby a circular sector of this circular configuration.

In their closing position, the valve means 45 commonly form a channel 53, which, at the upstream ends of the valve means, emerges into the tube 5 but which stops before the downstream ends 50 of the valve means, which in said closing position forms a tight closure through bearing against each other. This channel 53 is, as most clearly appears from FIG. 12, formed as each one of the valve means presents an inwardly located recess, which however stops before the lower ends of the valve means.

It is important that the valve means 45 are so designed that overpressure in relation to the surrounding and present in the flexible tube 5 tends to affect the valve means in opening direction, but that this affection is intended to be overcome by the elastic means 46 as long as the flexible tube 5 is not affected by the operator, i.e. that the elastic means 46 is capable of holding the valve arrangement 2 closed as long as it is the pump arrangement 7 which defines the pressure inside the tube 5. When, however, a pressure increase appears as the operator presses the tube 5 together, the effect of the means 46 is intended to be overcome so that the valve arrangement opens thanks to the valve means rocking according to what is indicated in FIG. 11. When affection on the tube 5 ceases, the means 46 brings back the valve means to closing position.

The elastic means 46 is fastened to the flexible tube 5 or to the end section 40 in an arbitrary way.

It is clear that the invention in no way is limited to just the descripted embodiment but that many modifications are possible within the frame of the concept of the invention. As an example it might be mentioned that the pump arrangement 7 and the pressure sensor 10 can be modified in a plurality of ways as long as they are arranged to work without needing to be in any direct contact with the substance in the conduit 6.

I claim:

1. A dispensing device for flowing substances, in particular food substances and the like, comprising a container for accommodating a flowing substance, said container being in communication with a flexible tube, said flexible tube capable of receiving said flowing substance and having, at an end thereof, an opening for discharging said flowing substance from said flexible tube and a valve arrangement for regulation of said flowing substance to be discharged from said opening upon application of pressure applied to said flexible tube, the improvement comprising:

a conduit which extends between said container and said flexible tube thereby providing fluid communication between said container and said flexible tube; a pump arrangement for movement of said flowing substance from said container, via said conduit, to said flexible tube; a pressure sensor, being in communication with said pump arrangement, for detecting pressure changes in said conduit such that when pressure in said conduit is below a threshold value said pump arrangement is activated and when pressure in said conduit is above a threshold value said pump arrangement is inactivated; and a valve arrangement which, in a closed condition, prevents discharge of said flowing substance from said opening of said flexible tube and which opens when pressure applied to said flexible tube exceeds a threshold value, thereby permitting the discharge of flowing substance from said opening of the tube.

2. The device according to claim 1 wherein said pressure sensor is responsive to width changes in said conduit.

3. The device according to claim 1 wherein one end of said conduit is connected to said container and said other end is connected to said flexible tube and wherein said valve arrangement is located at an end of said flexible tube adjacent to said opening.

4. The device according to claim 1 wherein one end of said conduit is connected to said container and further comprises a cutting means attached at said end of said conduit for breaking a seal of said container.

5. The device according to claim 1 wherein said container is in the form of a flexible bag.

6. The device according to 1 wherein said container decreases in volume at a rate which is the same as a rate at which said flowing substance is discharged from said container, such that prior to being dispensed said flowing substance avoids contact with air.

7. The device according to claim 1 wherein said pump arrangement contacts an outer surface of said conduit thereby avoiding direct contact with said flowing substance.

8. The device according to claim 7 wherein at least a portion of said conduit is in the form of a hose and said pump arrangement further comprises at least two rolling members for engaging with said hose portion, said rolling members being rotatably mounted at each end of a carrying means, said carrying means capable of rotating about a central axis such that said rolling members, while engaging with said hose portion, move along and press against said hose portion, when said pump arrangement is activated.

9. The device according to claim 8 wherein said hose portion is in the form of an arc.

\* \* \* \* \*